(12) United States Patent
Sunder et al.

(10) Patent No.: US 11,521,281 B2
(45) Date of Patent: Dec. 6, 2022

(54) METHOD AND SYSTEM FOR PERFORMING NEGOTIATION TASK USING REINFORCEMENT LEARNING AGENTS

(71) Applicant: Tata Consultancy Services Limited, Mumbai (IN)

(72) Inventors: Vishal Sunder, Gurgaon (IN); Lovekesh Vig, Gurgaon (IN); Arnab Chatterjee, Gurgaon (IN); Gautam Shroff, Gurgaon (IN)

(73) Assignee: Tata Consultancy Services Limited, Mumbai (IN)

( * ) Notice: Subject to any disclaimer, the term of this patent is extended or adjusted under 35 U.S.C. 154(b) by 375 days.

(21) Appl. No.: 16/510,748

(22) Filed: Jul. 12, 2019

(65) Prior Publication Data

US 2020/0020061 A1 Jan. 16, 2020

(30) Foreign Application Priority Data

Jul. 13, 2018 (IN) .............................. 201821026198

(51) Int. Cl.
*G06Q 50/18* (2012.01)
*G06N 5/04* (2006.01)

(52) U.S. Cl.
CPC .......... *G06Q 50/188* (2013.01); *G06N 5/043* (2013.01)

(58) Field of Classification Search
CPC ...... G06Q 50/188; G06Q 30/06; G06N 5/043; G06N 3/006; G06N 3/0454; G06N 3/0445; G06N 3/08; G06N 3/02

See application file for complete search history.

(56) References Cited

U.S. PATENT DOCUMENTS

| | | |
|---|---|---|
| 7,103,580 B1 | 9/2006 | Batachia et al. |
| 7,373,325 B1 * | 5/2008 | Hadingham ........... G06Q 30/08 |
| | | 705/35 |

(Continued)

OTHER PUBLICATIONS

Se Hyung Oh, Does Content of Concessions Matter in Negotiation? Match Between Concessions Strategy and Target's Regulatory Focus, Graduate School of Vanderbilt University, Aug. 2012 (Year: 2012).*

(Continued)

*Primary Examiner* — Jan P Mincarelli
(74) *Attorney, Agent, or Firm* — Finnegan, Henderson, Farabow, Garrett & Dunner, LLP (57) ABSTRACT

This disclosure relates generally to method and system for performing negotiation task using reinforcement learning agents. Performing negotiation on a task is a complex decision making process and to arrive at consensus on contents of a negotiation task is often expensive and time consuming due to the negotiation terms and the negotiation parties involved. The proposed technique trains reinforcement learning agents such as negotiating agent and an opposition agent. These agents are capable of performing the negotiation task on a plurality of clauses to agree on common terms between the agents involved. The system provides modelling of a selector agent on a plurality of behavioral models of a negotiating agent and the opposition agent to negotiate against each other and provides a reward signal based on the performance. This selector agent emulate human behavior provides scalability on selecting an optimal contract proposal during the performance of the negotiation task.

15 Claims, 6 Drawing Sheets

(56) References Cited

U.S. PATENT DOCUMENTS

2005/0021486 A1* 1/2005 Naveh .................... G06Q 10/04
706/46
2018/0012227 A1* 1/2018 Tunnell .............. G06Q 20/4014

OTHER PUBLICATIONS

Mukun Cao, Automated negotiation for e-commerce decision making: A goal deliberated agent architecture for multi-strategy selection, Decision Support Systems 73 (2015) pp. 1-14 (Year: 2015).*
Lihong Chen, A reinforcement learning optimized negotiation method based on mediator agent, Expert Systems with Applications 41 (2014) pp. 7630-7640 (Year: 2014).*

* cited by examiner

METHOD AND SYSTEM FOR PERFORMING NEGOTIATION TASK USING REINFORCEMENT LEARNING AGENTS

PRIORITY CLAIM

This U.S. Patent application claims priority under 35 U.S.C § 119 to: Indian patent application no. (201821026198), filed on Jul. 13, 2018. The entire contents of the aforementioned application are incorporated herein by reference.

TECHNICAL FIELD

The disclosure herein generally relates for automation of negotiation task, and, more particularly, to a method and system for performing negotiation task using reinforcement learning agents.

BACKGROUND

Negotiation is a complex decision making process, where agents with different goals attempt to agree on common decision of a contract agreement. Generally, complex deals frequently involve multiple parties as well as multiple negotiating interactions to reach to a contract agreement. Process to arrive at consensus on contents of the contract agreement is often expensive and time consuming task due to the negotiation terms and the negotiation parties involved. Traditional negotiation methods involve face to face negotiation requiring manual intervention. Such negotiation dialogues contain both cooperative and adversarial elements, where human agents consume time to understand, plan, and generate utterances to achieve their goal. Complete automation in the negotiation process is been a topic of interest.

In an existing system attempting automation of negotiation process, agents or machine agents are trained with the reinforcement learning strategy, which makes the best use of the opponent's negotiation history. The negotiating agent makes decision of the opponent's offer type, dynamically adjusting the negotiation agent's belief of opponent in time to get more favorable and better negotiation result. However, the existing system limits in training agents with one or more different behavior patterns for contract negotiation thereby reducing time utilized by agents for performing the negotiation task and improving scalability.

In another existing system, modelling deep agents for negotiation with the availability of data can be trained to imitate humans using reinforcement learning technique. These models require training data collected from one or more resource extensive different domains. However, the existing system limits in adopting reinforcement learning agents trained with different behavioral patterns as humans for contract negotiation.

SUMMARY

Embodiments of the present disclosure present technological improvements as solutions to one or more of the above-mentioned technical problems recognized by the inventors in conventional systems. For example, in one embodiment, a system for performing negotiation task using reinforcement learning is provided. The system includes a processor, an Input/output (I/O) interface and a memory coupled to the processor is capable of executing programmed instructions stored in the processor in the memory to receive a request for performing the negotiation task by a negotiating agent implemented by the processor, between the negotiating agent and an opposition agent, to agree on an optimal contract proposal comprising a plurality of clauses from a set of clauses predefined for the negotiation task, wherein each of the negotiating agent and the opposition agent comprises a plurality of behavioral models modeled based on a reward function. Further, the negotiating agent with the plurality of behavioral models of the opposition agent negotiate one on one, to agree on a plurality of intermediate contract proposals, wherein the negotiation between each of the negotiating agent and the opposition agent is in accordance with a negotiation training procedure. Furthermore, a selector agent selects the optimal contract proposal from the plurality of intermediate contract proposals generated by performing negotiation between the negotiation agent and the opposition agent based on the negotiation training procedure, wherein the selector agent is an ensemble of the plurality of behavioral models of the negotiating agent and the opposition agent.

In another aspect, a method for performing a negotiation task using reinforcement learning agents is provided. The method includes receiving a request for performing the negotiation task by a negotiating agent implemented by the processor, between the negotiating agent and an opposition agent, to agree on an optimal contract proposal comprising a plurality of clauses from a set of clauses predefined for the negotiation task, wherein each of the negotiating agent and the opposition agent comprises a plurality of behavioral models modeled based on a reward function. Further, the negotiating agent with the plurality of behavioral models of the opposition agent negotiate one on one, to agree on a plurality of intermediate contract proposals, wherein the negotiation between each of the negotiating agent and the opposition agent is in accordance with a negotiation training procedure. Furthermore, a selector agent selects the optimal contract proposal from the plurality of intermediate contract proposals generated by performing negotiation between the negotiation agent and the opposition agent based on the negotiation training procedure, wherein the selector agent is an ensemble of the plurality of behavioral models of the negotiating agent and the opposition agent.

In yet another aspect, a non-transitory computer readable medium having embodied thereon a computer program for executing a method for receiving a request for performing the negotiation task by a negotiating agent implemented by the processor, between the negotiating agent and an opposition agent, to agree on an optimal contract proposal comprising a plurality of clauses from a set of clauses predefined for the negotiation task, wherein each of the negotiating agent and the opposition agent comprises a plurality of behavioral models modeled based on a reward function. Further, the negotiating agent with the plurality of behavioral models of the opposition agent negotiate one on one, to agree on a plurality of intermediate contract proposals, wherein the negotiation between each of the negotiating agent and the opposition agent is in accordance with a negotiation training procedure. Furthermore, a selector agent selects the optimal contract proposal from the plurality of intermediate contract proposals generated by performing negotiation between the negotiation agent and the opposition agent based on the negotiation training procedure, wherein the selector agent is an ensemble of the plurality of behavioral models of the negotiating agent and the opposition agent.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The embodiments herein provides a method and system for performing a negotiation task using reinforcement learning agents. The reinforcement learning agents performing the negotiation task communicate each other for negotiation using a simple communication protocol. The negotiation task herein refers to any contract agreement, private document, a license document, a legal document and/or confidential document comprising a plurality of clauses that needs to be negotiated between the two reinforcement learning agents to agree for obtaining an optimal contract proposal. The reinforcement learning agents herein includes a negotiating agent and an opposition agent and these reinforcement learning agents resides into the agents repository of the negotiation system for performing the received negotiation task. The negotiation system comprises a negotiation module 212 and an agents repository 214. The negotiation module 212 includes a negotiating agent, an opposition agent and a selector agent. The negotiation task may be obtained from one or more user involved in negotiation such that one user may be a seller and the other user may be a buyer. The negotiating agent and the opposition agent of the negotiation system initially receives the negotiation task from a user. The negotiation task comprises a plurality of clauses from a set of clauses predefined for the negotiation task. Each of the negotiating agent and the opposition agent obtains a plurality of behavioral models by playing several rounds of negotiation levels against each other. The plurality of behavioral models comprises a Selfish-Selfish (SS) model, a Selfish-Prosocial (SP) model, a Prosocial-Selfish (PS) model and a Prosocial-Prosocial (PP) model reflecting behavioral aspect of the negotiating agent paired with behavioral aspect of the opposition agent during the performance of the negotiation task. Further, the negotiating agent with the plurality of behavioral models and the opposition agent with the plurality of behavioral models are stored in the agents repository.

For the purpose of performing the negotiation task, the negotiating agent with the plurality of behavioral models negotiates for each clause with the plurality of behavioral models of the opposition agent for the said clause to agree on an optimal contract proposal. Here, the negotiating agent and the opposition agent are trained with a negotiation training procedure for generating a plurality of intermediate contract proposals. Further, a selector agent associated with the negotiation system selects an intermediate contract proposal from the plurality of intermediate contract proposals based on a reward function obtained by each of the plurality of intermediate contract proposals. Here, the selector agent is an ensemble of the plurality of behavioral models of the negotiating agent and the opposition agent.

Referring now to the drawings, and more particularly to FIGS. 1 through 7, where similar reference characters denote corresponding features consistently throughout the figures, there are shown preferred embodiments and these embodiments are described in the context of the following exemplary system and/or method.

Figure 1:
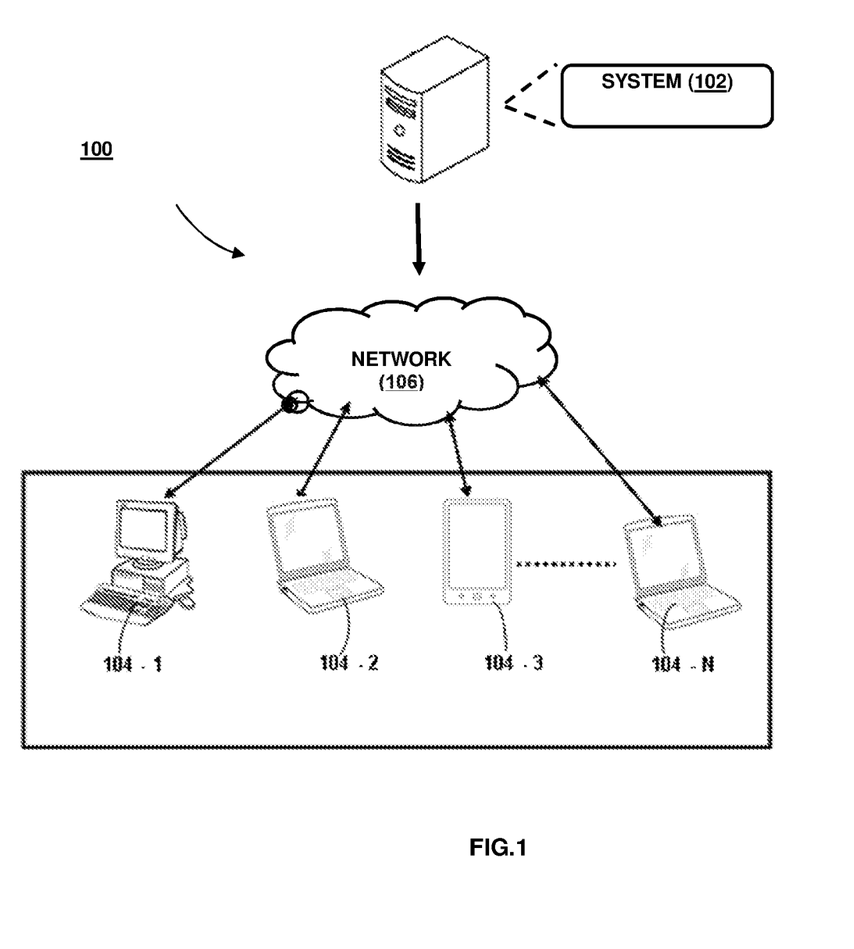
FIG. 1 illustrates a networking implementation of a negotiation system performing a negotiation task using reinforcement learning agents in accordance with an embodiment of the present disclosure.

FIG. 1 illustrates a networking implementation of a negotiation system performing a negotiation task using a reinforcement learning agents in accordance with an embodiment of the present disclosure. The system 102, alternatively referred as negotiation system 102, is configured to receive a negotiation task from one or more user. The negotiation system 102 may be embodied in a computing device, for instance a computing device 104. Although the present disclosure is explained considering that the negotiation system 102 is implemented on a server, it may be understood that the negotiation system 102 may also be implemented in a variety of computing systems, such as a laptop computer, a desktop computer, a notebook, a workstation, a cloud-based computing environment and the like. In one implementation, the negotiation system 102 may be implemented in a cloud-based environment. It will be understood that the negotiation system 102 may be accessed by multiple users through one or more user devices 104-1, 104-2 . . . 104-N, collectively referred to as user devices 104 hereinafter, or applications residing on the user devices 104. Examples of the user devices 104 may include, but are not limited to, a portable computer, a personal digital assistant, a handheld device, a Smartphone, a Tablet Computer, a workstation and the like. The user devices 104 are communicatively coupled to the system 102 through a network 106.

In an embodiment, the network 106 may be a wireless or a wired network, or a combination thereof. In an example, the network 106 can be implemented as a computer network, as one of the different types of networks, such as virtual private network (VPN), intranet, local area network (LAN), wide area network (WAN), the internet, and such. The network 106 may be either a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the network 108 may include a variety of network devices, including routers, bridges, servers, computing devices, storage devices. The network devices within the network 106 may interact with the negotiation system 102 through communication links. As discussed above, the negotiation system 102 may be implemented in a computing device 104, such as a hand-held device, a laptop or other portable computer, a tablet computer, a mobile phone, a PDA, a smartphone, and a desktop computer. The negotiation system 102 may also be implemented in a workstation, a mainframe computer, a server, and a network server. The components and functionalities of the negotiation system 102 are described further in detail with reference to FIG. 2 and FIG. 3.

Figure 2:
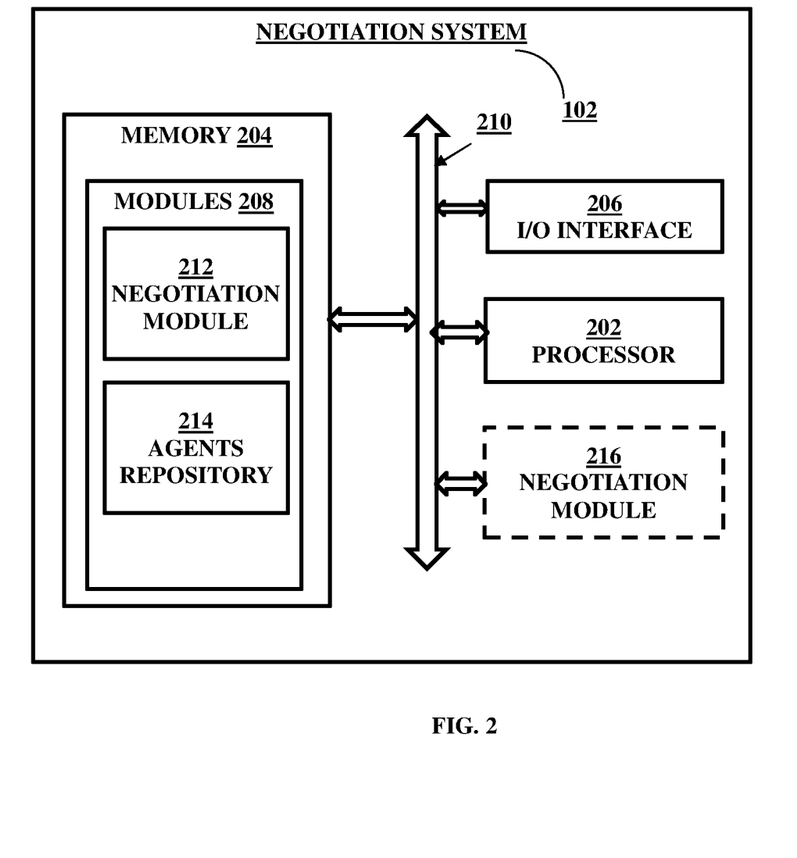
FIG. 2 illustrates an exemplary block diagram of the negotiation system performing the negotiation task using the reinforcement learning agents with another embodiment of the present disclosure.

FIG. 2 illustrates an exemplary block diagram of the negotiation system performing the negotiation task using the reinforcement learning agents with another embodiment of the present disclosure. In an example embodiment, the negotiation system 102 may be embodied in, or is in direct communication with the system, for example the negotiation system 102 (FIG. 1). The negotiation system 200 includes or is otherwise in communication with one or more hardware processors such as a processor 202, at least one memory such as a memory 204, and an I/O interface 206, a negotiation module 212 and an agents repository 214. In an embodiment, the negotiation module 216 can be implemented as a standalone unit in the negotiation system 102. In another embodiment, negotiation module 212 can be implemented as a module in the memory 204. The processor 202, memory 204, and the I/O interface 206, module 208 may be coupled by a system bus such as a system bus 210 or a similar mechanism.

The I/O interface 206 may include a variety of software and hardware interfaces, for example, a web interface, a graphical user interface, and the like. The interfaces 206 may include a variety of software and hardware interfaces, for example, interfaces for peripheral device(s), such as a keyboard, a mouse, an external memory, a camera device, and a printer. Further, the interfaces 206 may enable the system 102 to communicate with other devices, such as web servers and external databases. The interfaces 206 can facilitate multiple communications within a wide variety of networks and protocol types, including wired networks, for example, local area network (LAN), cable, etc., and wireless networks, such as Wireless LAN (WLAN), cellular, or satellite. For the purpose, the interfaces 206 may include one or more ports for connecting a number of computing systems with one another or to another server computer. The I/O interface 206 may include one or more ports for connecting a number of devices to one another or to another server.

The hardware processor 202 may be implemented as one or more microprocessors, microcomputers, microcontrollers, digital signal processors, central processing units, state machines, logic circuitries, and/or any devices that manipulate signals based on operational instructions. Among other capabilities, the hardware processor 202 is configured to fetch and execute computer-readable instructions stored in the memory 204. The memory 204 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 204 includes a plurality of modules 208, received, and generated by one or more of the modules 208. The modules 208 may include routines, programs, objects, components, data structures, and so on, which perform particular tasks or implement particular abstract data types. The negotiation module 212 of the system 200 can be configured to receive a contract proposal from one or more user to be negotiated with the trained negotiating agent and the opposition agent.

Figure 3:
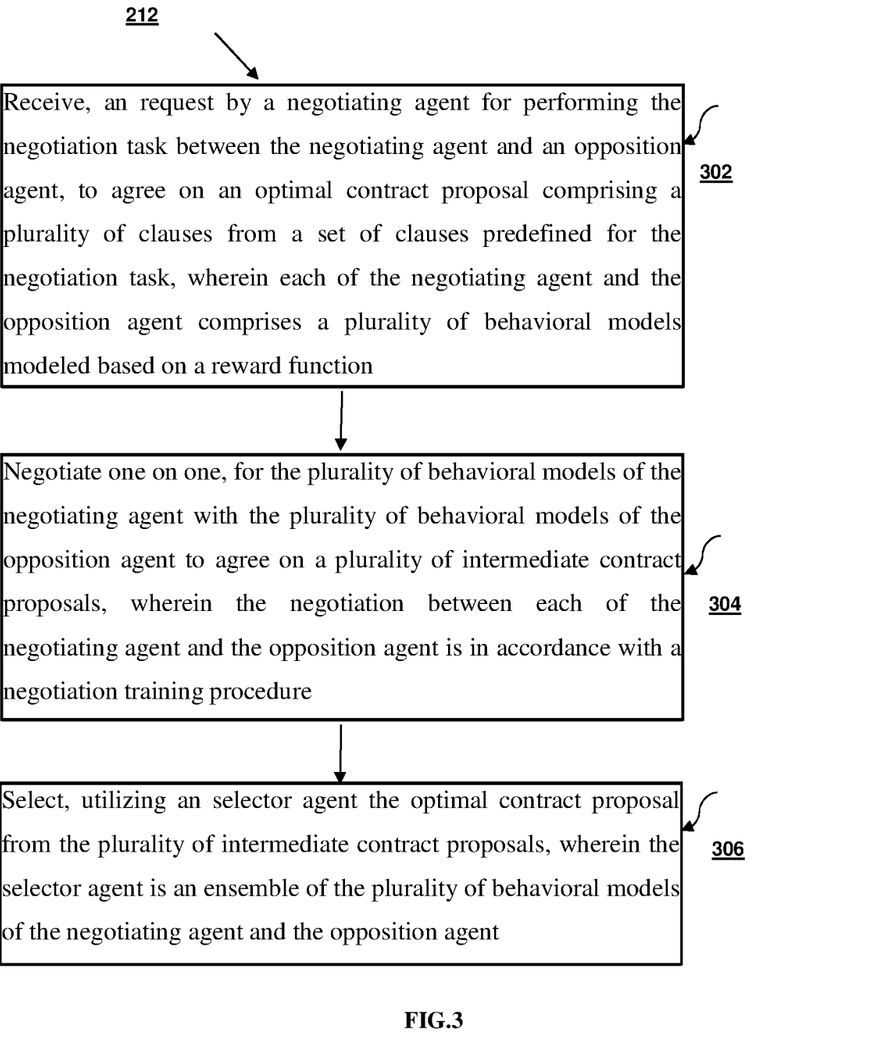
FIG. 3 is a flow diagram 300 illustrating steps of a method for performing the negotiation task reinforcement learning agents of the negotiation system of FIG. 1, in accordance with an embodiment of the present disclosure.

FIG. 3 is a flow diagram 300 illustrating steps of a method for performing the negotiation task using the reinforcement learning agents of the negotiation system of FIG. 1, in accordance with an embodiment of the present disclosure. In an embodiment, the system 100 comprises one or more data storage devices or the memory 102 operatively coupled to the one or more processors 104 and is configured to store instructions for execution of steps of the method 300 by the one or more processors (alternatively referred as processor(s)) 104 in conjunction with various modules of the modules 108. The steps of the method 300 of the present disclosure will now be explained with reference to the components or blocks of the system 100 as depicted in FIG. 1 and the steps of flow diagram as depicted in FIG. 2 through 7. Although process steps, method steps, techniques or the like may be described in a sequential order, such processes, methods and techniques may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

At step 302 of the method 300, the negotiation module 212 implemented by the processor 204, is configured to receive a request by a negotiating agent, for performing the negotiation task between the negotiating agent and an opposition agent. The negotiation task brings the negotiation agent and the opposition agent to agree on an optimal contract proposal. The contract proposal comprises a plurality of clauses from a set of clauses predefined for the negotiation task. Further, each of the negotiating agent and the opposition agent comprise a plurality of behavioral models, which are modeled based on a reward function. The reinforcement learning agents includes the negotiation agent and the opposition agent associated with the negotiation module 212 of the negotiation system 102. Considering an example where the negotiation system 102 receives the negotiation task from one or more user. The received negotiation task is a contract document that needs to be negotiated between two parties wherein one of the user may be a seller and the other user may be a buyer. Performing the negotiation task using agents it is important to have a robust communication protocol. Here, the negotiating agent and the opposition agent are trained to converse using an interpretable sequence of bits. The training is done using reinforcement learning. Initially, the negotiating agent and the opposition agent are modelled as a neural network and then these two such agents are trained concurrently where they play several rounds of negotiation levels against each other and learn to coordinate with each other based on the outcome as reward function. The behavior of the negotiating agent and the opposition agent is modeled using the effective technique of varying the reward signal. With this proactive training, two agents with 4 different behavior model are obtained. The negotiating agent and the opposition agent trained in this manner indeed learn to coordinate their moves and produce context relevant outputs.

At 304, the method 300 includes negotiating one on one, by the negotiating agent with the plurality of behavioral models of the opposition agent to agree on a plurality of intermediate contract proposals, wherein the negotiation between each of the negotiating agent and the opposition agent is in accordance with a negotiation training procedure. The negotiating agent obtains at time step 't' a plurality of state inputs, wherein the plurality of state inputs includes a utility function, an opponent offer, a previous opponent offer and an agent ID.

It's Utility function $U^A$
offer given by opponent B, $S_t^B$
It's previous offer, $S_{t-1}^A$
Agent ID, $I \in \{0,1\}$ Here, the received input is converted into a dense representation $D_t^A$ as, $$D_t^A = [\text{OfferMLP}([U^A, S_t^B]), \text{OfferMLP}(U^A, S_{t-1}^A), \text{AgentLookup}(I), \text{TurnLookup}(t)] \quad (1)$$

Here, OfferMLP (.) a 2-layer MLP and a AgentLookup(.) is an embedding which gives a dense representation for the agent identity and TurnLookup (.) is another embedding which encodes information in the time step 't'.

The representation $D_t^A$ is passed to a 2-Layer GRU (gated recurrent unit) as $$h_t^A = \text{GRU}(D_t^A, h_{t-1}^A) \quad (2)$$

Where, $h_{t-1}^A$ is the hidden state generated by A at its previous turn. The number of bits to be flipped are predicted based on the action taken by the reinforcement learning agents sampling from the intermediate contract proposal $\pi_A$, $$\pi_A = \text{Softmax}(Wh_t^A) \quad (3)$$

During test time selection of the action performed by the reinforcement learning agents with the highest probability. At the next time step 't+1', the agent B also outputs a similar intermediate contract proposal $\pi_B$. Each of the reinforcement learning agent $i \in \{A, B\}$ optimize to maximize the following object individually:

$$L_i = \mathop{E}_{x_t \sim (\pi_A, \pi_B)} \left[ \sum_t \gamma^{(T-t)}(r_i(x_{1...T}) - b_i) \right] + \lambda H[\pi_i] \quad (4)$$

Here,
'$x_t$' is the action taken by an agent t,
'$\gamma$' is the discount factor,
'T' is the total time steps for which the negotiation lasts,
'$r_i(x_1, \ldots T)$' is the reward received by the negotiating agent and the opposition agent 'i' at the end of the negotiation which is a function of the sequence of actions '$x_t$' taken by the agent from t=1 to t=T, '$b_i$' is the baseline which is used to reduce variance, and
'$H[\pi_i]$' is the entropy regularization term to ensure exploration and controls this degree of exploration.

The parameters of the negotiating agent A and the opposition agent B are shared with each other and these parameters are updated after each episode. Each episode refers to a negotiation level between the negotiating agent A and the opposition agent B. Here, the training is executed for 5 epochs with 105 episodes in each epoch.

In one embodiment, the negotiating agent for the corresponding behavioral model from the plurality of behavioral models generates, a first intermediate contract proposal utilizing the plurality of said state inputs for performing the negotiation task. Here, the first intermediate contract proposal predicts the number of bits to be flipped during the performance of the negotiation task. Further, the opposition agent obtains at next time step 't+1' for the corresponding behavioral from the plurality of behavioral models, a second intermediate contract proposal based on the first intermediate contract proposal obtained from the negotiating agent. Here, the second intermediate contract proposal maximizes the offer in the intermediate contract proposal for performing the negotiation task. Further, the reward is assigned for each behavior model of the intermediate contract proposal of the negotiating agent and the opposition agent based on the performed negotiation task. The reward is assigned such that a maximum reward is assigned to the negotiating agent and the opposition agent, if the generated intermediate contract proposal is optimal and a minimum reward is assigned to the negotiating agent and the opposition agent, if the generated intermediate contract proposal is not optimal. In one embodiment, the plurality of behavior models for the negotiating agent and the opposition agent of the negotiation system 102 describes the manner in which the rewards given to the reinforcement learning agents decides its behavior. The reinforcement learning agents with selfish behavior model and the agent with prosocial behavior agent represents in the following below mentioned steps, 1. For enforcing prosocial behavior model from the plurality of behavioral models of the negotiating agent and the opposition agent, a reward is given (the number of points earned at the end of the negotiation) when the deal is optimal for each clause associated with the negotiation task. If the deal is not optimal, the negotiating agent and the opposition agent is given a reward of −0.5. This ensures that the negotiating agent and the opposition agent not only cares about its own gain/loss while learning its intermediate contract proposal but also takes into account the opponent's priorities as well. In other words, the reward here has a signal for the overall optimality.

2. If there is no optimality signal in the reward, the negotiating agent/the opposition agent receives as a reward, whatever it earned in the negotiation, then a selfish behavior model is induced. The negotiating agent/the opposition agent then, learns to maximize its own score.

Both the reinforcement learning agents such that the negotiating agent and the opposition agent receives a reward of −0.5 if the negotiation ends in a disagreement between both the agents. Here, the two agents negotiating agent and the opposition agent learn concurrently to obtain two agents with 4 different behavior model depending on the opponent is trained to behave, 1. Prosocial agent trained against a Prosocial agent (PP): The behavior PP when both the reinforcement learning agents negotiating agent and the opposition agent are trained to have a Prosocial behavior model.
2. Selfish agent trained against a Selfish agent (SS): If both the agents negotiating agent and the opposition agent are trained to be selfish for obtaining the agent Selfish agent trained against a Selfish agent.
3. Selfish agent trained against a Prosocial agent and vice-versa (SP, PS): When one agent is trained to be selfish and its opponent is trained to be prosocial, obtaining two agents represented as SP and PS respectively.

At 306, the method 300 includes selecting, by a selector agent, the optimal contract proposal from the plurality of intermediate contract proposals, wherein the selector agent is an ensemble of the plurality of behavioral models of the negotiating agent and the opposition agent. Here, the plurality of contract proposals generated by the negotiating agent and the opposition agent are obtained for each behavior from the plurality of behavioral models and then am intermediate contract proposal is determined utilizing the plurality of contract proposals obtained from the plurality of behavioral models of the negotiating agent and the opposition agent and the maximum reward attained by each of the intermediate contract proposals and the frequency distribution of the negotiating agent selection sequence. For emulating human behavior, a selector agent is trained with a dynamic behavior. The trained selector agent is an ensemble of the 2 agents with 4 different behaviors modeling for selecting an appropriate behavior based on the negotiation state. Further, the negotiation agents in real world scenarios, performance are evaluated with experiments where the negotiating agent and the opposition agent play against human players. The negotiating agent and the opposition agent provides consistency in behaviors even against human players. The negotiating agent and the opposition agent are deployable in real industrial scenarios for performing negotiating on the negotiation task. The selector agent is modeled with dynamic behavior. The selfish agent outperforms always outscores its opponents. However, using such an agent leads to many disagreements if the opponent is also selfish as described in Table 2 column 1. In such observation the fact that the selfish and prosocial behavior are not separable processes in negotiation. Here, the humans don't really negotiate using a fixed policy they adopt either the prosocial behavior model or the selfish behavior model. They tend to follow a mixed behavior with some degrees of both depending on the state of the negotiation process. The present disclosure models one optimal contract proposal that works well against all agents using a mixture of agents with the plurality of behavioral models. This is obtained by training another reinforcement learning gent known as selector agent to choose which of the 2 agents with 4 different behavior model for selecting the optimal contract proposal for the given state of the negotiation obtained from the negotiation task.

Figure 4:
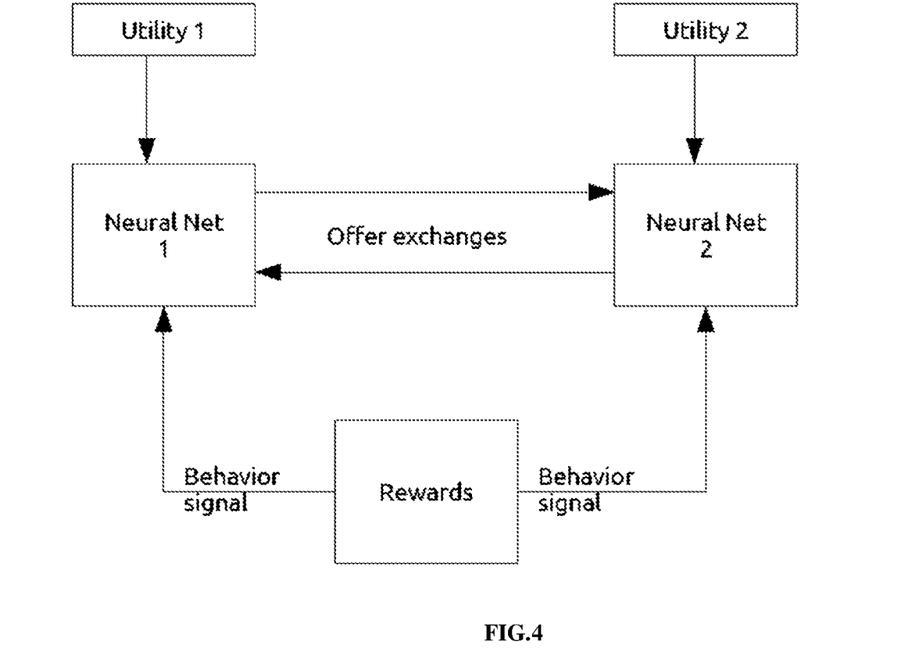
FIG. 4 illustrates an exemplary architecture of the negotiation system where reinforcement learning agents negotiate with each other on a set of clauses associated with the negotiation task negotiation interaction between the reinforcement learning agents, in accordance with an embodiment of the present disclosure.

FIG. 4 illustrates an exemplary architecture of the negotiation system where reinforcement learning agents negotiate with each other on a set of clauses associated with the negotiation task negotiation interaction between the reinforcement learning agents, in accordance with an embodiment of the present disclosure. The negotiation task, alternatively referred as task, may be performed in any document comprising a plurality of clauses to agree on common terms between the negotiating parties. It will be noted that for the purpose of designing and training model for performing the negotiation task, herein the agents perform the task residing in the agents repository of the negotiation module. The model is designed such that the user obtains an optimal contract proposal from a plurality of intermediate contract proposals. In an embodiment, the negotiation system 102 includes a deep neural network (DNN) component and a rule based component. The deep neural network (DNN) Component is utilized to decide the number of bits to be flipped in the opponent's offer, wherein the deep neural network is trained through Reinforcement Learning (RL). The rule based component decides the exact bits to be flipped in a deterministic way such that flipping the bits that result in maximum increase in score. For example considering an, if the utility is [2,−6,−2;−4, 7, 3], the opponent's offer is [1, 1, 1, 0, 0, 1] and the number of bits to be flipped is 3 (decided by the neural network) that flips the second, third and fifth bit (rule based).

Figure 5:
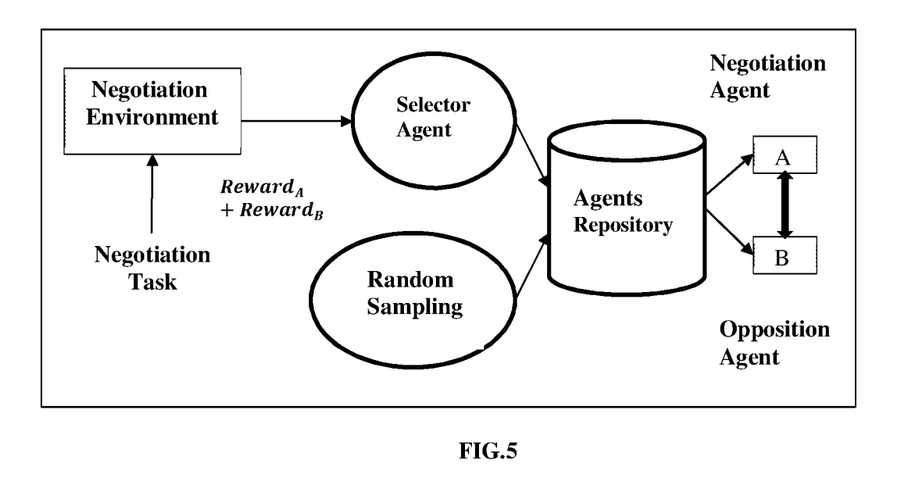
FIG. 5 is an exemplary architecture of the negotiation system performing the negotiation task using the reinforcement learning agents of FIG. 2, in accordance with an embodiment of the present disclosure.

FIG. 5 is an exemplary architecture of the negotiation system performing the negotiation task using the reinforcement learning agents of FIG. 2, in accordance with an embodiment of the present disclosure. In an example scenario, for performing the negotiation task on the plurality of clauses associated with the contract agreement from the negotiation environment. Here, two agents negotiating agent and the opposition agent negotiate one-on-one to agree on common terms as to which clauses need to be included or excluded from the contract agreement. Considering there are 6 clauses in the contract agreement on which the negotiating agent and the opposition agent performs the negotiation task in the negotiation environment. The value that an agent attaches to the clauses is represented by a utility function which is a vector of 6 integers between −12 and 12 (excluding 0) such that their sum is zero. There is an additional constraint that there is at least one positive and one negative value in this vector and that the sum of positives is +12 and that of the negatives is −12. This vector is represented as U=Shuffle (P⊕N). Here, P=[$p_1, p_2, p_3 \ldots p_k$] and N=[$n_1, n_2, n_3 \ldots n_{6-k}$], where 0<k<6, ⊕ is the concatenation operator and shuffle (.) is a 'random shuffling' function. Also, $p_i \in \{1, \ldots, 12\}$ and $n_i \in \{-12, \ldots, -1\}$, along the constraints that $\Sigma_i p_i = 12$ and $\Sigma_i n_i = -12$. Each element in the list represents the importance that the agent attaches to the corresponding clause. The distribution so that in every case there is a mixture of the most beneficial clauses (values summing to 12) and the most harmful clauses (values summing to −12). Each of the negotiating agent and the opposition agent receives this utility function which is sampled uniformly. The negotiating agent and the opposition agent communicate with each other by giving offers, which is a sequence of 6 bits $S_t \in \{0,6\}$. Here, subscript t refers to the time-step at which the offer was produced. Each bit in this sequence is the agent's decision on the corresponding clause (0 meaning exclude and 1 meaning include). The communication follows a sequential structure and the agent that goes first is decided by an unbiased coin flip. This communication goes on between the negotiating agent and the opposition agent until it obtains:

1. An agreement is reached. This happens when an negotiating agent and the opposition agent gives the offer as the same intermediate contract proposal that it receives.
2. The time runs out. We keep a limit of 30 offers (15 for each agent) after which the negotiation process stops with a disagreement.

At the end of the negotiation task, each of the negotiating parties such as the negotiating agent and the opposition agent gets a reward based on the agreed sequence of bits. So, if the negotiating agent A and the opposition agent B have utilities $U^A$ and $U^B$ respectively, and the agreed sequence is S, A gets S. $U^A$ and B gets S. $U^B$, where (.) represents the dot product.

Figure 6:
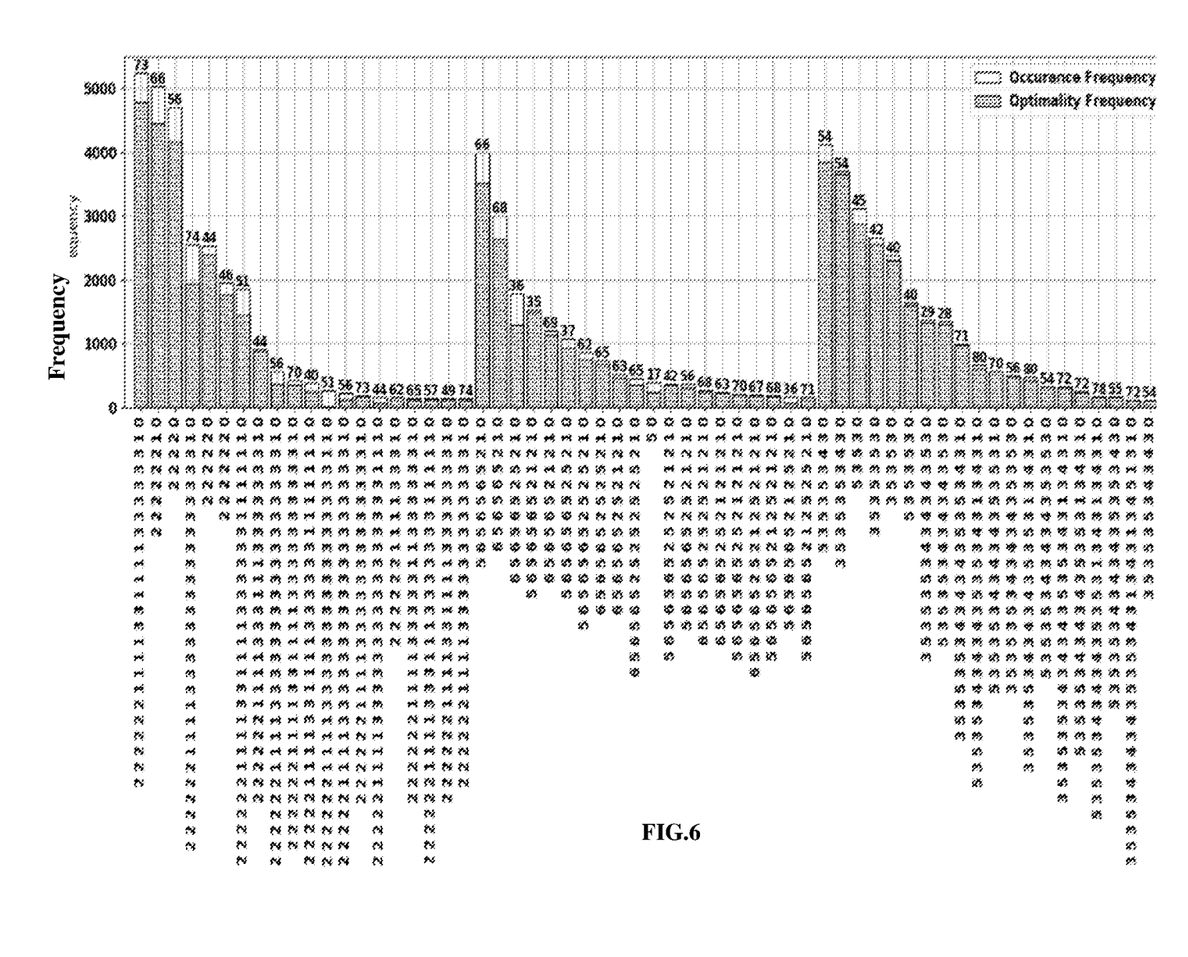
FIG. 6 illustrates performance evaluation of the reinforcement learning agents corresponding to the plurality of behavioral models based on the frequency distribution for the sequence of actions taken for the performed negotiation task, in accordance with an embodiment of the present disclosure.

FIG. 6 illustrates performance evaluation of the reinforcement learning agents corresponding to the plurality of behavioral models based on the frequency distribution for the sequence of actions taken for the performed negotiation task, in accordance with an embodiment of the present disclosure. The distribution figure shows in each bar represents the optimal deals. The distribution shows that there is a joint preference among agents for certain sequences more than others which is evident by their skewed nature. The analysis of the plurality of behavioral models may be tested whether the reinforcement learning agents learn something non-trivial, we compare its performance with two simple baselines:

1. RANDOM At every step, the reinforcement learning agent chooses random number of bits to be flipped.
2. COMMON Agent 1 (agent who goes first) gives its most selfish offer followed by Agent 2 who does the same. At the third step, Agent 1 offers the intersection of the first two offers to which Agent 2 agrees. If there is no intersection, it is a disagreement. The results in Table 1 are an average over a separate test set of 30000 negotiations. Here, the Agent 1 may be an negotiating agent and the Agent 2 may be an opposition agent, Coordination between the trained negotiating agent and the opposition agent is depicted as represented in Table 1 as mentioned below. In optimality column, the numbers in bracket are the percentages on the agreed deals.

both agents are not only concerned with maximizing their own reward but also of their opponent's so as to reach optimal deals.

In one embodiment, the negotiation task performed by the negotiating agent and the opposition agent is evaluated based on computing a metrics. The metric parameters includes a dialog length, an agreement rate, an optimality rate, and an average score. The dialog length for the negotiation evaluation metrics describes the average number of time steps for which the negotiation task lasts. The agreement rate of the negotiation evaluation metrics describes the percentage of negotiations that ends in an agreement representing the agreement rate. The optimality rate of the negotiation evaluation metrics describes the percentage of negotiations that end in an optimal deal. Further, if the deal is optimal if it is both Pareto Optimal and the negotiating agent and the opposition agent receives a positive score. The solution is pareto optimal if neither agent's score can be improved without lowering the other's score. The average score of the negotiation evaluation metrics describes the average number of points earned by each of the negotiating agent and the opposition agent, the maximum joint reward the agents can earn on an average on optimal deals. The negotiation agent and the opposition agent examines through all possible deals (26=64) for all the samples in the test set and selects the one intermediate contract proposal which results in the maximum joint reward and optimal deals. The average of maximum joint reward for the test set is 1:40 (0:70 for each agent). To analyze the performance of the negotiating agent and the opposition agent against an intermediate contract proposal, the test negotiations are executed between the agents who have never seen each other during training. These negotiations are what we refer to as interplay negotiations as represented in Table 2 as shown in the results of these negotiations.

TABLE 1 an average over a separate test set of 30000 negotiations

| Agent A | Agent B | Dialog Length | Agreement Rate (%) | Optimality Rate (%) | Average Score A (0.70) | B (0.70) |
|---|---|---|---|---|---|---|
| Random | | 15.90 | 100 | 24.55 | 0.25 | 0.25 |
| Common | | 3.77 | 79.54 | 70.39 (88.49) | 0.50 | 0.50 |
| PP | PP | 16.98 | 96.24 | 82.33 (85.55) | 0.65 | 0.66 |
| SS | SS | 17.47 | 88.31 | 74.88 (84.79) | 0.54 | 0.69 |
| SP | PS | 13.87 | 91.90 | 86.74 (94.38) | 0.73 | 0.55 |

The results obtained for the performed negotiation task by the negotiating agent and the opposition agent is listed as represented in Table 1 that all the three variants of the behavioral combinations do better than the baselines in terms of the optimality and joint reward. This represents that the agents which are trained against each other learns to coordinate with their moves such that apart from maintaining their enforced behavior, maximizing their scores as well as the optimality. The joint reward is maximum when the negotiating agent and the opposition agent are prosocial as

TABLE 2

Interplay between agents. In optimality column, the numbers in bracket are the percentage on the agreed deals. As we get two SSs and PPS after training we choose the ones which outscore its opponent during training and use them in the interplay negotiation

| Agent A | Agent B | Dialog Length | Agreement Rate (%) | Optimality Rate (%) | Agreement Score | |
|---|---|---|---|---|---|---|
| SP | SS | 26.50 | 59.00 | 55.81 (94.59) | 0.42 | 0.48 |
| PP | PS | 9.85 | 97.96 | 62.55 (63.85) | 0.51 | 0.68 |

TABLE 2-continued

Interplay between agents. In optimality column, the numbers in bracket are the percentage on the agreed deals. As we get two SSs and PPS after training we choose the ones which outscore its opponent during training and use them in the interplay negotiation

| Agent A | Agent B | Dialog Length | Agreement Rate (%) | Optimality Rate (%) | Agreement Score | |
|---|---|---|---|---|---|---|
| PP | SS | 23.98 | 90.01 | 69.80 (77.54) | 0.44 | 0.75 |
| SP | PP | 24.64 | 90.43 | 64.28 (71.08) | 0.71 | 0.45 |
| SS | PS | 11.89 | 93.03 | 69.43 (74.63) | 0.70 | 0.50 |

In one embodiment, for analyzing the performance of the reinforcement learning agent against an intermediate contract proposal. The test negotiation is executed between each of the negotiation agent and the opposition agent who have never seen each other during training. These negotiations are represented as interplay negotiations as represented in Table 2. These results are an average over the test set of 30000 negotiations. The optimalities of the interplay between the negotiating agent and the opposition agent are not very high which is because these agents have never seen each other during training and thus have not been able to develop their intermediate contract proposal accordingly. Moreover, the agreement rate is highest (97.96%) for negotiation between the prosocial agents (PP vs PS) and the lower (59.00%) for selfish agents. The selfish agents outscore the prosocial agents which confirms their corresponding behaviors. The scores obtained when two agents are trained with the same reward signal but trained against different opponents negotiate with each other. The SS outscores SP by a margin of 0.06 and similarly PS beats PP by 0.17 points. The interplay negotiations as represented in Table 2 observes varying degrees of selfish/prosocial behavior in agents with some agents being more selfish than others. To verify the consistency in agent behavior, the differences in scores (Player A–Player B) for all interplay negotiations in the form of a matrix as represented in Table 3. Here, each entry is the difference in scores when corresponding agents negotiate.

TABLE 3

Difference in scores for all agent combinations. The selfishness of an agent decreases from left to right and top to bottom

|  |  | Player B | | | |
|---|---|---|---|---|---|
|  |  | SS | SP | PS | PP |
| Player A | SS | — | 0.06 | 0.20 | 0.31 |
|  | SP | — | — | 0.18 | 0.26 |
|  | PS | — | — | — | 0.17 |
|  | PP | — | — | — | — |

The differences are in increasing order along every row and decreasing along columns. As the agents are arranged in decreasing order of their selfishness from left to right and top to bottom, this kind of distribution confirms consistency in their behavior such that if A beats B with a margin m and B beats C, then A should be able to beat C with a margin greater than m. These results are an average over the test set of 30000 negotiations. The selector agent is an ensemble of the two agent with four different behavioral models. The selector agent is utilized to select the output offer of one of the two agents with their plurality of behavioral models given the context U. This selector agent is modeled as a neural network that it also takes the output of all the two agents with their associated plurality of behavioral models as part of its state input. The selector agent outputs an optimal contract proposal $\pi_s$ among the plurality of intermediate contract proposals from which an action is sampled. This action is the offer produced as by one of the agent with the plurality of behavioral models.

The selector agent maximizes the following objective:

$$L_s = \underset{s_t \sim \pi_s}{E} \sum_t \gamma^{(T-t)}((r_s(s_{1...T}) + r_o) - b_s) + \lambda H[\pi_s] \quad (5)$$

where $r_s(s_{1...T})$, is the reward that selector agent gets at the end of the negotiation which is a function of the sequence of actions $s_t$ it takes and $r_o$ is the reward of the opponent. Here, a joint reward is assigned to the selector agent which is a simple way of ensuring that it is not biased towards one particular agent while selecting. For training, we randomly select one of the four agents as the opponent and make it play a batch of 100 negotiation episodes with the selector agent. During this process, we freeze the weights of the opponent as we run 105 episodes for 5 epochs.

Figure 7:
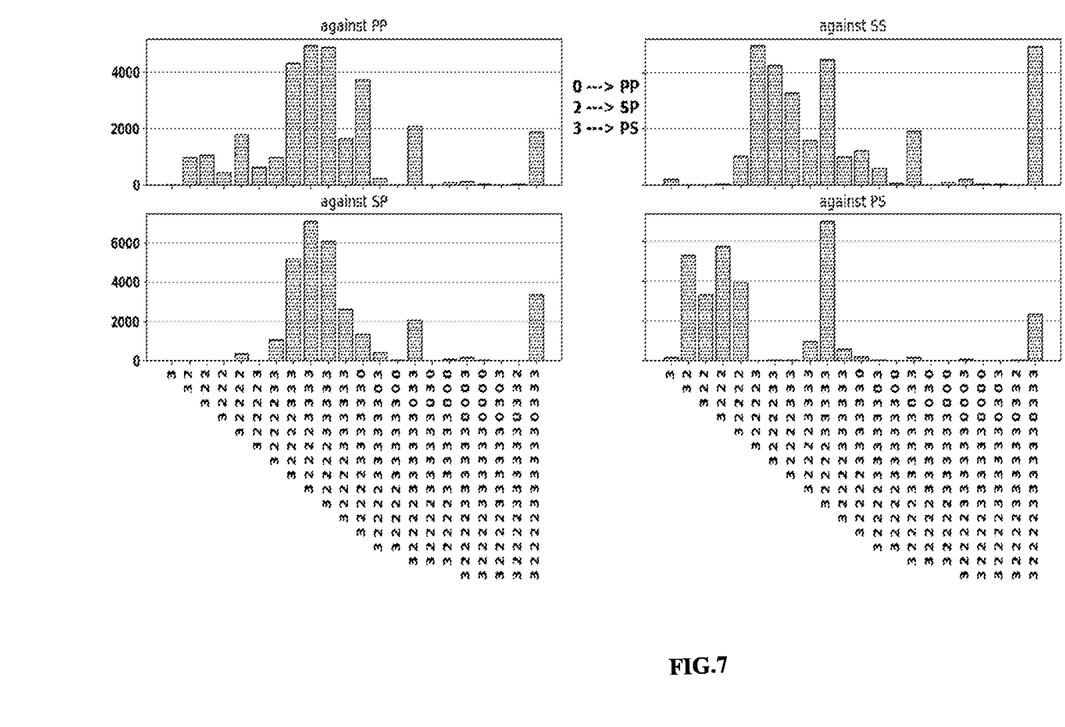
FIG. 7 illustrates frequency distribution values for selecting an optimal contract proposal using a selector agent for the negotiation task performed by the reinforcement learning agents, in accordance with an embodiment of the present disclosure.

FIG. 7 illustrates frequency distribution values for selecting an optimal contract proposal using a selector agent for the negotiation task performed by the reinforcement learning agents, in accordance with an embodiment of the present disclosure. The analysis as described, makes the selector agent negotiate against each with the plurality of behavioral models of the negotiating agent and the opposition agent one by one on the test set and the results are reported in Table 4. In terms of the scores, the selector agent is able to outscore the prosocial agents but not the selfish ones. The selector agent does well to coordinate with all agents with is reflected by the optimality. Also, the joint reward for all the cases is greater than 1.20. In spite of that, it is not able to match on results reported in Table 1.

TABLE 4

Performance of the selector agent against all the plurality of behavioral models of the negotiating agent and the opposition agent.

| Agent B | Dialog Length | Agreement Rate (%) | Optimality Rate (%) | Agreement Score | |
|---|---|---|---|---|---|
|  |  |  |  | Selector Agent | B |
| PP | 18.68 | 94.41 | 77.15(81.71) | 0.64 | 0.61 |
| PP | 19.17 | 86.25 | 73.33(85.02) | 0.44 | 0.66 |
| SP | 13.10 | 92.27 | 76.56(82.97) | 0.71 | 0.55 |
| PS | 20.53 | 90.22 | 81.40(90.22) | 0.55 | 0.71 |

The selector agent learns a decision tree for the frequency distribution of the agent selection sequence that it follows against all two agents with the plurality of behavioral models as described in the FIG. 7. The four distributions in the x axis is the sequence of agent selection. Moreover, every sequence is a subsequence of some larger sequence. The selector agent learns to follow a decision tree. The fact that the selector agent learns a decision tree suggests the following:
1. The agent learns just one intermediate contract proposal (the simplest) which works against all agents.
2. The ensemble difficulties for an agent to decipher the behavior of the opponent until after a few moves, hence it makes sense to learn just one policy which works well at any stage.

In one embodiment, the human evaluation may be described as, the fact that negotiating agent and the opposition agent learns to negotiate against each other. But for real life deployment, it is really important to evaluate the performance while performing the negotiating task against human players. For this purpose, an experiment where humans played several rounds of negotiation task with all the five negotiation agents (PP, SS, SP, PS and SELECTOR). A total of 38 human players negotiated for 3 rounds of negotiation against all 5 agents. This means that each agent played a total of 114 negotiation games against humans. Humans were told that their aim was to maximize their scores. This was further ensured by providing them an incentive for every game they outscore the agent (reward) as represented mentioned below in Table 5,

TABLE 5

Results of Human Evaluation

| Agent | Dialog Length | Agreement Rate (%) | Optimality Rate (%) | Agent Score | Human Score | Agent Won (%) | Human won (%) | Tied (%) |
|---|---|---|---|---|---|---|---|---|
| PP | 15.07 | 87.38 | 70.87 | 0.58 | 0.62 | 36.67 | 51.11 | 12.22 |
| SS | 19.56 | 73.79 | 60.20 | 0.58 | 0.44 | 60.53 | 21.05 | 18.42 |
| PS | 13.57 | 92.93 | 66.67 | 0.57 | 0.57 | 40.22 | 52.17 | 7.61 |
| SP | 21.75 | 72.28 | 59.41 | 0.61 | 0.39 | 68.49 | 20.55 | 10.96 |
| Selector | 16.78 | 88.30 | 56.40 | 0.57 | 0.56 | 46.99 | 44.58 | 8.43 |

The results obtained from both the selfish agents (SS and SP) outscore humans most of the time. The prosocial agents (PP and PS) on the other hand, get outscored on more occasions. The behavior of human players is between prosocial behavior and selfish behavior model a hybrid behavior which outperforms when a selector agent was obtained. With the selector agent, humans win an almost equal number of times as the selector agent. The present disclosure provides emulating the human behavior through the selector agent for selecting an optimal contract proposal performed negotiating one on one by the negotiating agent and the opposition agent.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein addresses unresolved problem of performing negotiation task with the agents trained with the plurality of behavioral models. The proposed system describes a deep learning model and a reinforcement learning procedure for training the agents to negotiate on the negotiation task. Further, modeling the negotiating agent and the opposition agent with the selfish or prosocial behavior model is modelled based on the behavior models adapted by human players. Also, the agents can decide on the behavioral model of the opposition agent based on the behavioral variations observed and these agents gets dynamically trained based on the data obtained during the performance of the negotiation task.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor implemented method for performing a negotiation task, the method comprising:
   receiving, by a negotiating agent implemented by the processor, a request for performing the negotiation task between the negotiating agent and an opposition agent, to agree on an optimal contract proposal comprising a plurality of clauses from a set of clauses predefined for the negotiation task, wherein each of the negotiating agent and the opposition agent comprises a plurality of behavioral models modeled based on a reward function;
   negotiating one on one, by the negotiating agent with the plurality of behavioral models of the opposition agent to agree on a plurality of intermediate contract proposals, wherein the negotiation between each of the negotiating agent and the opposition agent is in accordance with a negotiation training procedure, and wherein the negotiation agent and the opposition agent are trained to converse using interpretable sequence of bits, the negotiation agent and the opposition agent are modelled as a neural network and trained concurrently;
   utilizing, by a deep neural network (DNN) component to decide the number of interpretable sequence of bits to be flipped during negotiation; and
   selecting, by a selector agent, the optimal contract proposal from the plurality of intermediate contract proposals generated by performing negotiation between the negotiation agent and the opposition agent based on the negotiation training procedure, wherein the selector agent is an ensemble of the plurality of behavioral models of the negotiating agent and the opposition agent, and wherein the negotiation agent decides on the plurality of behavioral models of the opposition agent based on behavioral variations observed and the negotiation agent and the opposition agent are dynamically trained based on the data obtained during performance of the negotiation task.

2. The method as claimed in claim 1, wherein each of the plurality of behaviors models comprises a Selfish-Selfish (SS) model, a Selfish-Prosocial (SP) model, a Prosocial-Selfish (PS) model and a Prosocial-Prosocial (PP) model reflecting behavioral aspect of the negotiating agent paired with behavioral aspect of the opposition agent.

3. The method as claimed in claim 1, wherein the negotiating training procedure for performing the negotiation task between each of the negotiating agent and the opposition agent comprises:
   obtaining, by the negotiating agent at time step T a plurality of state inputs, wherein the plurality of state inputs includes a utility function, an opponent offer, a previous opponent offer and an agent ID;
   generating, by the negotiating agent for the corresponding behavioral from the plurality of behavioral models, a first intermediate contract proposal utilizing the plurality of said state inputs for performing the negotiation task, wherein the first intermediate contract proposal predicts the number of bits to be flipped during the performance of the negotiation task;
   generating, by the opposition agent at next time step 't+1' for the corresponding behavioral from the plurality of behavioral models, a second intermediate contract proposal based on the first intermediate contract proposal obtained from the negotiating agent, wherein the second intermediate contract proposal maximizes the offer in the intermediate contract proposal for performing the negotiation task; and
   assigning, a reward for each behavior model of the intermediate contract proposal of the negotiating agent and the opposition agent based on the performed negotiation task.

4. The method as claimed in claim 1, wherein assigning the reward for each behavior model of the intermediate contract proposal comprises:
   a maximum reward is assigned to the negotiating agent and the opposition agent, if the generated intermediate contract proposal is optimal; and
   a minimum reward is assigned to the negotiating agent and the opposition agent, if the generated intermediate contract proposal is not optimal.

5. The method as claimed in claim 1, wherein selecting the optimal contract proposal using the selector agent comprises:
   obtaining, the plurality of contract proposals generated by the negotiating agent and the opposition agent for each behavior from the plurality of behavioral models; and
   determining, the intermediate contract proposal utilizing the plurality of contract proposals obtained from the plurality of behavioral models of the negotiating agent and the opposition agent and the maximum reward attained by each of the intermediate contract proposals and the frequency distribution of the negotiating agent selection sequence.

6. A system (102) for performing a negotiation task, the system (102) comprises:
   a processor (202);
   an Input/output (I/O) interface (204); and
   a memory (208) coupled to the processor (202), the memory (208) comprising:
   receive, by a negotiating agent implemented by the processor, a request for performing the negotiation task between the negotiating agent and an opposition agent, to agree on an optimal contract proposal comprising a plurality of clauses from a set of clauses predefined for the negotiation task, wherein each of the negotiating agent and the opposition agent comprises a plurality of behavioral models modeled based on a reward function;
   negotiate one on one, by the negotiating agent with the plurality of behavioral models of the opposition agent to agree on a plurality of intermediate contract proposals, wherein the negotiation between each of the negotiating agent and the opposition agent is in accordance with a negotiation training procedure, and wherein the negotiation agent and the opposition agent are trained to converse using an interpretable sequence of bits, the negotiation agent and the opposition agent are modelled as a neural network and trained concurrently;

utilizie, by a deep neural network (DNN) component to decide the number of interpretable sequence of bits to be flipped during negotiation; and select, by a selector agent, the optimal contract proposal from the plurality of intermediate contract proposals generated by performing negotiation between the negotiation agent and the opposition agent based on the negotiation training procedure, wherein the selector agent is an ensemble of the plurality of behavioral models of the negotiating agent and the opposition agent, and wherein the negotiation agent decides on the plurality of behavioral models of the opposition agent based on behavioral variations observed and the negotiation agent and opposition agent are dynamically trained based on the data obtained during performance of the negotiation task.

7. The system (102) as claimed in claim 6, wherein each of the plurality of behavioral models comprises a Selfish-Selfish (SS) model, a Selfish-Prosocial (SP) model, a Prosocial-Selfish (PS) model and a Prosocial-Prosocial (PP) model reflecting behavioral aspect of the negotiating agent paired with behavioral aspect of the opposition agent.

8. The system (102) as claimed in claim 6, wherein the negotiating training procedure for performing the negotiation task between each of the negotiating agent and the opposition agent comprises:

obtaining, by the negotiating agent at time step T a plurality of state inputs, wherein the plurality of state inputs includes a utility function, an opponent offer, a previous opponent offer and an agent ID;

generating, by the negotiating agent for the corresponding behavior from the plurality of behavioral models, a first intermediate contract proposal utilizing the plurality of said state inputs for performing the negotiation task, wherein the first intermediate contract proposal predicts the number of bits to be flipped during the performance of the negotiation task;

generating, by the opposition agent at next time step 't+1' for the corresponding behavior from the plurality of behavioral models, a second intermediate contract proposal based on the first intermediate contract proposal obtained from the negotiating agent, wherein the second intermediate contract proposal maximizes the offer in the intermediate contract proposal for performing the negotiation task; and assigning, a reward for each behavior model of the intermediate contract proposal of the negotiating agent and the opposition agent based on the performed negotiation task.

9. The system (102) as claimed in claim 6, wherein assigning the reward for each behavior model of the intermediate contract proposal comprises:

a maximum reward is assigned to the negotiating agent and the opposition agent, if the generated intermediate contract proposal is optimal; and a minimum reward is assigned to the negotiating agent and the opposition agent, if the generated intermediate contract proposal is not optimal.

10. The system as claimed in claim 6, wherein selecting the optimal contract proposal using the selector agent comprises:

obtaining, the plurality of contract proposals generated by the negotiating agent and the opposition agent for each behavior from the plurality of behavioral models; and determining, the intermediate contract proposal utilizing the plurality of contract proposals obtained from the plurality of behavioral models of the negotiating agent and the opposition agent and the maximum reward attained by each of the intermediate contract proposals and the frequency distribution of the negotiating agent selection sequence.

11. One or more non-transitory machine readable information storage mediums comprising one or more instructions which when executed by one or more hardware processors perform actions comprising:

receiving, by a negotiating agent implemented by the processor, a request for performing the negotiation task between the negotiating agent and an opposition agent, to agree on an optimal contract proposal comprising a plurality of clauses from a set of clauses predefined for the negotiation task, wherein each of the negotiating agent and the opposition agent comprises a plurality of behavioral models modeled based on a reward function;

negotiating one on one, by the negotiating agent with the plurality of behavioral models of the opposition agent to agree on a plurality of intermediate contract proposals, wherein the negotiation between each of the negotiating agent and the opposition agent is in accordance with a negotiation training procedure, and wherein the negotiation agent and the opposition agent are trained to converse using an interpretable sequence of bits, the negotiation agent and the opposition agent are modelled as a neural network and trained concurrently;

utilizing, by a deep neural network (DNN) component to decide the number of interpretable sequence of bits to be flipped during negotiation; and selecting, by a selector agent, the optimal contract proposal from the plurality of intermediate contract proposals generated by performing negotiation between the negotiation agent and the opposition agent based on the negotiation training procedure, wherein the selector agent is an ensemble of the plurality of behavioral models of the negotiating agent and the opposition agent, wherein the negotiation agent decides on the plurality of behavioral models of the opposition agent based on behavioral variations observed and the negotiation agent and the opposition agent are dynamically trained based on the data obtained during performance of the negotiation task.

12. The one or more non-transitory machine readable information storage mediums of claim 11, wherein each of the plurality of behaviors models comprises a Selfish-Selfish (SS) model, a Selfish-Prosocial (SP) model, a Prosocial-Selfish (PS) model and a Prosocial-Prosocial (PP) model reflecting behavioral aspect of the negotiating agent paired with behavioral aspect of the opposition agent.

13. The one or more non-transitory machine readable information storage mediums of claim 11, wherein the negotiating training procedure for performing the negotiation task between each of the negotiating agent and the opposition agent comprises:

obtaining, by the negotiating agent at time step T a plurality of state inputs, wherein the plurality of state inputs includes a utility function, an opponent offer, a previous opponent offer and an agent ID;

generating, by the negotiating agent for the corresponding behavioral from the plurality of behavioral models, a first intermediate contract proposal utilizing the plurality of said state inputs for performing the negotiation task, wherein the first intermediate contract proposal predicts the number of bits to be flipped during the performance of the negotiation task;

generating, by the opposition agent at next time step 't+1' for the corresponding behavioral from the plurality of behavioral models, a second intermediate contract proposal based on the first intermediate contract proposal obtained from the negotiating agent, wherein the second intermediate contract proposal maximizes the offer in the intermediate contract proposal for performing the negotiation task; and assigning, a reward for each behavior model of the intermediate contract proposal of the negotiating agent and the opposition agent based on the performed negotiation task.

14. The one or more non-transitory machine readable information storage mediums of claim 11, wherein assigning the reward for each behavior model of the intermediate contract proposal comprises:

a maximum reward is assigned to the negotiating agent and the opposition agent, if the generated intermediate contract proposal is optimal; and a minimum reward is assigned to the negotiating agent and the opposition agent, if the generated intermediate contract proposal is not optimal.

15. The method as claimed in claim 11, wherein selecting the optimal contract proposal using the selector agent comprises:

obtaining, the plurality of contract proposals generated by the negotiating agent and the opposition agent for each behavior from the plurality of behavioral models; and determining, the intermediate contract proposal utilizing the plurality of contract proposals obtained from the plurality of behavioral models of the negotiating agent and the opposition agent and the maximum reward attained by each of the intermediate contract proposals and the frequency distribution of the negotiating agent selection sequence.

* * * * *